(12) United States Patent
Wiseman et al.

(10) Patent No.: US 7,505,844 B2
(45) Date of Patent: Mar. 17, 2009

(54) MODEL-BASED ITERATIVE ESTIMATION OF GAS TURBINE ENGINE COMPONENT QUALITIES

(75) Inventors: Matthew William Wiseman, Fairfield, OH (US); Malcolm John Ashby, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 485 days.

(21) Appl. No.: 11/283,345

(22) Filed: Nov. 18, 2005

(65) Prior Publication Data

US 2007/0118271 A1     May 24, 2007

(51) Int. Cl.
G06F 19/00     (2006.01)
(52) U.S. Cl. ......................................... 701/100; 477/30
(58) Field of Classification Search ......... 701/100–102; 477/30; 105/35–38; 180/301; 700/286–287, 700/290
See application file for complete search history.

(56) References Cited

U.S. PATENT DOCUMENTS

2007/0055392 A1* 3/2007 D'Amato et al. .............. 700/44
2007/0118270 A1* 5/2007 Wiseman et al. ............ 701/100
2007/0260424 A1* 11/2007 Brown et al. ................ 702/182

FOREIGN PATENT DOCUMENTS

| EP | 1103926 A | 5/2001 |
| EP | 1357487 A | 10/2003 |
| EP | 1420153 A | 5/2004 |

* cited by examiner

Primary Examiner—Yonel Beaulieu
(74) Attorney, Agent, or Firm—McNees Wallace & Nurick, LLC

(57) ABSTRACT

A method of estimating quality parameters for a plurality of engine components of a gas turbine engine is provided. The engine components have at least one sensor responsive to the engine component operation. The method includes providing an engine model having virtual sensor values and quality parameters corresponding to the plurality of sensors of the engine components; comparing the virtual sensor values to actual sensor values of the plurality of sensors of the engine components to determine the difference between the actual and virtual sensor values; amplifying the difference by a predetermined gain; generating a plurality of quality parameter deltas in response to the sensed difference; iteratively updating the embedded engine model by inputting a predetermined portion of the generated quality parameter deltas into the embedded engine model; adjusting the embedded engine model for engine operating conditions; and recalculating the virtual sensor values.

22 Claims, 4 Drawing Sheets

MODEL-BASED ITERATIVE ESTIMATION OF GAS TURBINE ENGINE COMPONENT QUALITIES

FIELD OF THE INVENTION

The present invention relates generally to gas turbine engines, and more particularly to a method of tracking and estimating engine component qualities.

BACKGROUND OF THE INVENTION

As gas turbine engines operate, the engines may become less efficient due to a combination of factors including wear and damage. Because the rate at which engines deteriorate depends on several operational factors, the rate is difficult to predict, and as such, engine components are typically scheduled for maintenance based on a pre-selected number of hours or cycles. The pre-selected number is typically conservatively selected based on a number of factors including past component experience and past engine performance estimates. If a component fails, a predetermined diagnosis routine is followed to identify and replace the failed component.

To estimate engine performance and to find engine sensor faults, selected engine parameters are sensed and monitored to estimate an overall loss in the engine performance. Typically, rotor speeds, exhaust gas temperatures, and fuel flows are corrected or normalized for variations in operating conditions, and these normalized parameters are trended, i.e., their changes over short and long periods of time are plotted, and used to forecast when engine refurbishment is required. Additionally, immediate engine repairs may be scheduled if comparing current trending values to prior trending values illustrates abrupt changes, or step changes.

While currently the overall engine performance and quality is inferred by assessing engine sensor values during operation and long-term trending, the quality level of individual gas turbine components, such as fan, compressor or turbines, is not estimated and continuously updated during operation.

What is needed is the ability to forecast the remaining engine life before an engine overhaul is required, through the estimation and tracking of engine component quality. What is also needed is the ability to define the scope of the required engine overhaul, and to detect and isolate engine component damage and faults.

SUMMARY OF THE INVENTION

The present invention is directed to a method of estimating quality parameters for a plurality of engine components of a gas turbine engine. The engine components have at least one sensor responsive to the engine component operation. The method includes providing an engine model having virtual sensor values and quality parameters corresponding to the plurality of sensors of the engine components; comparing the virtual sensor values to actual sensor values of the plurality of sensors of the engine components to determine the difference between the actual and virtual sensor values; amplifying the difference by a predetermined gain; generating a plurality of quality parameter deltas in response to the sensed difference; iteratively updating the embedded engine model by inputting a predetermined portion of the generated quality parameter deltas into the embedded engine model; adjusting the embedded engine model for engine operating conditions; and recalculating the virtual sensor values; and repeating the steps of comparing, amplifying, generating, and updating the embedded model for a predetermined percentage of the generated quality delta parameters.

In another aspect, the present invention is directed to a diagnostic system for estimating quality parameters for a plurality of engine components of a gas turbine engine. The system includes an engine model for computing virtual sensor values and quality parameters corresponding to the plurality of sensors of the engine components. A comparator is connected to the engine model output for comparing the virtual sensor values to actual sensor values of a plurality of sensors of the engine components to determine the difference between the actual and virtual sensor values. The differences are multiplied by an amplifier having a predetermined gain. A processor unit generates a plurality of quality parameter deltas in response to the determined difference in actual versus virtual sensor values. Automatic switching means iteratively updates the engine model by switching a predetermined portion of the generated quality parameter deltas into the embedded engine model. The model also has inputs for sensing engine operating conditions for adjusting the virtual sensor values for feedback to the comparator.

One advantage of the present invention is the ability to track and to estimate engine component quality for forecasting useful life, for determining the scope of a maintenance overhaul, and for detecting and isolating component damage or faults.

Another advantage of the present invention is the ability to track quality parameters for each individual component of an engine.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
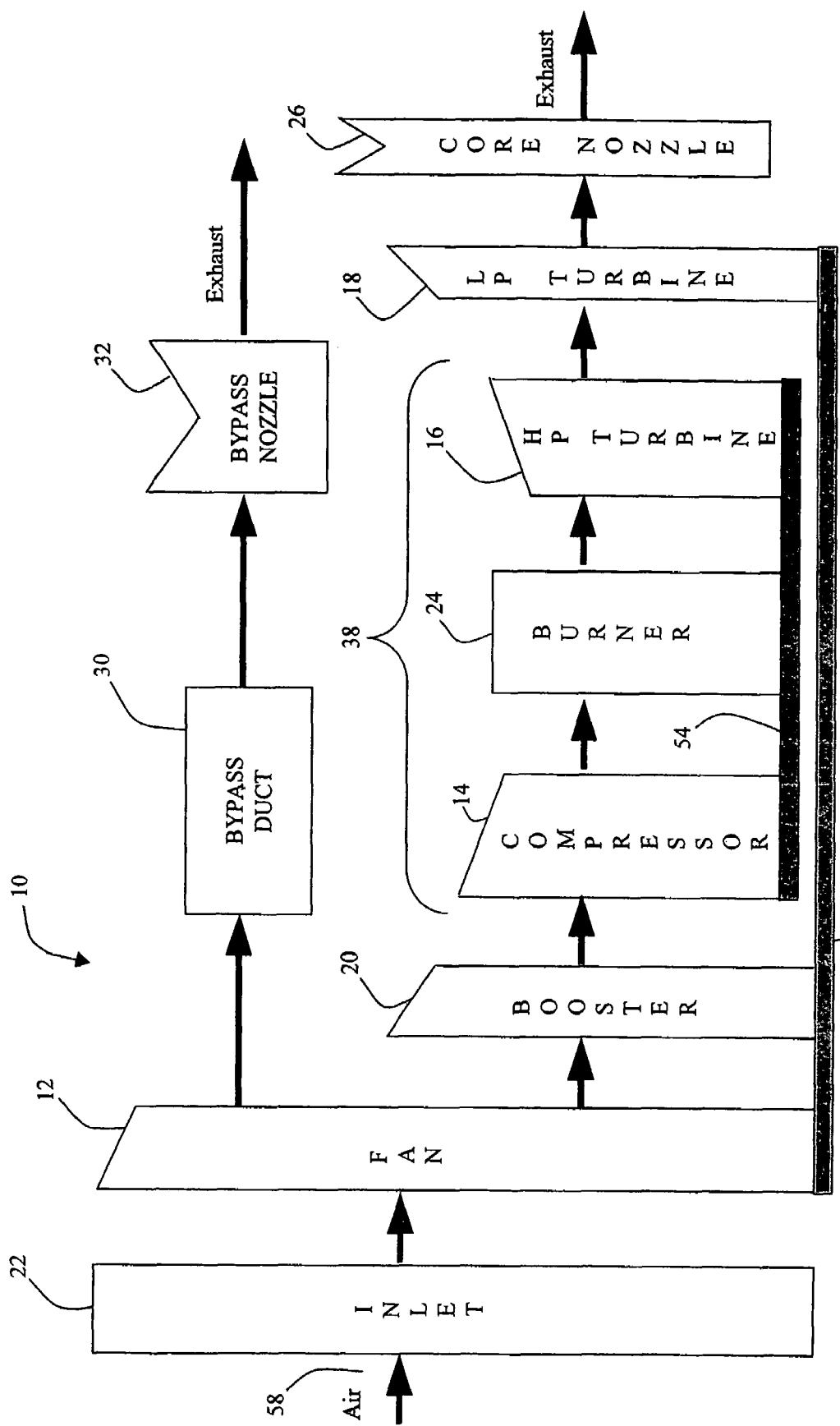
FIG. 1 is a schematic diagram of a physics-based embedded component level model.

Referring first to FIG. 1, a gas turbine engine includes a plurality of sensors (not shown), which monitor engine operation and input real-time actual engine sensor data during engine operation to engine model 10. In one embodiment, the sensors monitor engine rotor speeds, engine temperatures, and engine pressures. Ambient flight condition data is also input to engine model 10. Ambient flight condition data input includes, but is not limited to, ambient temperature, ambient pressure, aircraft mach number, and engine power setting parameters such as fan speed or engine pressure ratio. Any suitable technique for collecting ambient flight condition data and actual engine sensor data can be used.

Engine model 10 is used to estimate sensed parameters, such as rotor speeds, temperatures, and pressures, as well as computed parameters such as thrust, airflows, stall margins, and turbine inlet temperature. The computed parameters are based on environmental conditions, power setting parameters, and actuator positions input into engine model 10. In the exemplary embodiment, engine model 10 is a physics-based aerothermodynamic model. In another embodiment, engine model 10 is a regression-fit model. In a further embodiment, engine model 10 is a neural-net model.

A physics-based engine model 10 includes a core engine 38 including in serial, axial flow relationship, a high pressure compressor 14, a combustor or burner 24, and a high pressure turbine 16. Core engine 38 is downstream from an inlet 22 and fan 12 and booster 20. Fan 12 and booster 20 are in serial, axial flow relationship with core engine 38 and a bypass duct 30 and a bypass nozzle 32. Fan 12, booster 20, and low pressure turbine 18 are coupled by a first shaft 52, and compressor 14 and high pressure turbine 16 are coupled with a second shaft 54. A portion of airflow 58 entering inlet 22 is channeled through bypass duct 30 and is exhausted through bypass nozzle 32, and the remainder of airflow 58 passes through core engine 38 and is exhausted through a core engine nozzle 26.

Engine model 10 is known as a Component Level Model (CLM) because each component, 12, 14, 16, 18, 20, and 24 within engine model 10 is individually modeled and then assembled into a specific engine model, such as physics-based engine model 10. Engine model 10 is programmed to represent a fast-running transient engine cycle that accounts for flight conditions, control variable inputs, and high-pressure compressor bleed. Further, engine model 10 includes parameters such as engine component efficiencies and flows which may be adjusted or tuned. These parameters can be modified using a parameter estimation algorithm, thereby modifying the model of a nominal or average engine to the model of a specific engine.

The CLM 10 is designed with realistic sensitivities to flight conditions, control variable inputs and high-pressure compressor bleed. The quality parameters for the CLM 10 comprise flow and efficiency modifiers for each major rotating component. Each of the fan 12, compressor 14, HP turbine 16, LP turbine 18, and in some cases, the booster 20, have a flow modifier and an efficiency modifier, resulting in eight quality parameters for the CLM 10, and possibly ten quality parameters if the booster 20 is included. The quality parameters are based on the sensed engine component parameters described above. These quality parameters can be adjusted or perturbed from their nominal values, thereby affecting the model calculations. Proper manipulation of these quality parameters permits the model to simulate the behavior of a particular engine more precisely, to take into account the effects of manufacturing variations between engines, engine deterioration, or damaged engine parts. Perturbation of the quality parameters allows for a better match of model-computed sensor values to actual engine sensor values.

Additionally, the physics based model 10 includes components and senses parameters associated with the air inlet 22, the burner 24, the core nozzle 26, the bypass duct 30, and the bypass nozzle 32.

When properly tracked, and given accurate sensor values, the model quality parameters reflect actual engine component quality levels, and these levels can be used to diagnose problems in the engine. For example, a "large" bird strike on the fan results in a "large" negative shift in the flow and efficiency of the fan in the model, resulting from the attempts of the tracking filter to match the model outputs to the engine sensors. If the damage caused by the bird striking the fan propagates to the compressor, a negative shift in the compressor quality parameters would also be seen.

Figure 2:
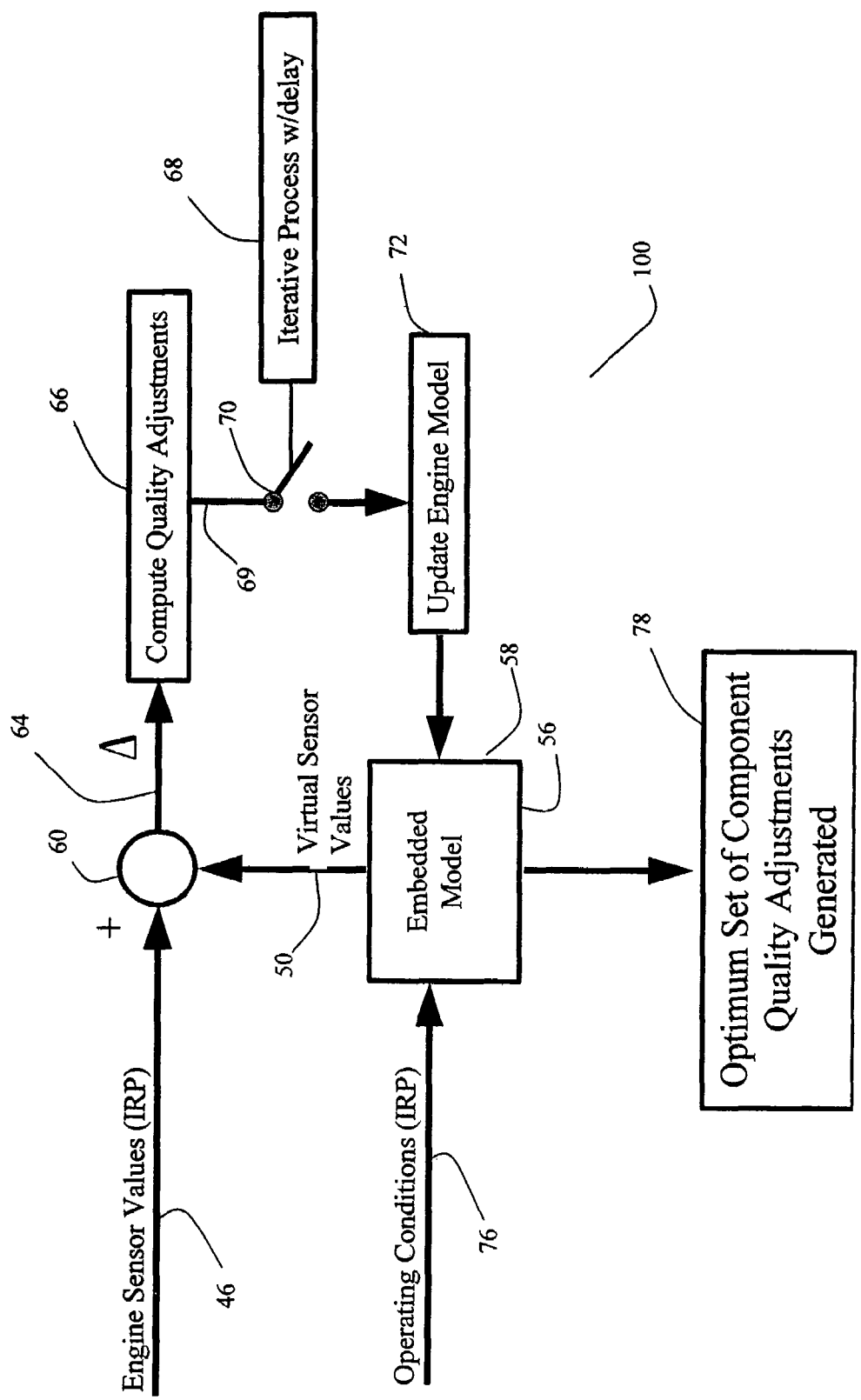
FIG. 2 is a diagram of the quality estimation method.

Referring next to FIG. 2, a diagram 100 of the parametric quality estimation method is illustrated. A logic unit (not shown) for executing the method of the invention may include a processor, the processor being implemented through a microprocessor and associated components such as RAM, I/O devices, and other computer components. The engine sensor values at intermediate rated power (IRP) 46 are input to a subtractor circuit 60. Virtual sensor values 50 are subtracted from the engine sensor values 46 and the difference (or delta) signal 64 is input to compute quality adjustments in filterblock 66, in which the differences between the virtual and engine sensor values 64 are multiplied by predetermined gain levels to yield computed quality adjustments 69. A predetermined percentage of the computed quality adjustments are input into block 72 for updating the embedded model 56 via an iterative process 68. The iterative process 68 with time delay controls the sampling rate indicated as switch 70, which is switched at a sufficiently high rate. Preferably the time delay is about 250 milliseconds (ms).

The engine model 56 is updated every delay period at step 72 with the computed quality adjustments 69. Operating conditions 76 at IRP are input to the adjusted engine model 56. The adjusted engine model 56 generates an optimum set of component quality adjustments 78, and also generates an updated set of virtual sensor values 50 to close the feedback loop to the subtractor 60, which are subtracted from the IRP engine sensor values 46 again in the next iteration. The iterative process performs continuous sampling and adjustments during the flight.

The iterative process of the present invention allows the embedded model of the engine 56 to migrate to a state where the virtual sensors closely match the actual engine sensors. The resulting modified component qualities computed in the embedded model 56 are optimized for the operating state. The quality estimation process is invoked at steady state engine operating conditions. Component quality adjustments are computed and the embedded model is iteratively adjusted. The component quality parameters can then be tracked throughout a flight whenever steady state operating conditions are met.

The method for computing gains for estimating the component quality adjustments is as follows:

$$Y(Q) = \begin{pmatrix} y_1(q_1, \ldots, q_m) \\ y_2(q_1, \ldots, q_m) \\ \vdots \\ y_n(q_1, \ldots, q_m) \end{pmatrix} \quad [1]$$

where n is the number of computed sensor values;

m is the number of quality parameters;

$y_i$ corresponds to a sensor value, (e.g., $y_1$ is fan speed, $y_2$ is core speed, etc.); and $q_i$ are the component quality parameters (e.g., $q_1$, is the fan flow modifier, $q_2$ is the fan efficiency, etc.)

Y is also a function of the states of the model, as well as other model values and variables, but quality parameters are the only parameters with which the system is concerned in this analysis. The first step for obtaining the set of gains for the iterative quality estimation algorithm is computing the Jacobian of Y(Q). The Jacobian of Y(Q) is defined as $$J_Y = \begin{pmatrix} \frac{\partial y_1}{\partial q_1} & \cdots & \frac{\partial y_1}{\partial q_m} \\ \vdots & \ddots & \vdots \\ \frac{\partial y_n}{\partial q_1} & \cdots & \frac{\partial y_n}{\partial q_m} \end{pmatrix} \quad [2]$$

Given actual engine sensor values $s_1, s_2, \ldots, s_n$, and the model computed sensor values $y_1, y_2, \ldots, y_n$, the error vector E is computed as follows:

$$E = (e_1 \ldots e_n) = (s_1 - y_1 \ldots s_n - y_n) \quad [3]$$

A delta change to the quality parameters is computed as the product of a design constant, or gain value h, the row vector E, and the matrix $J_Y$, or:

$$\Delta Q = (\Delta q_1 \ldots \Delta q_m) = hEJ_Y \quad [4]$$

At each iteration of the algorithm, $\Delta Q$ is computed based on the current values of E, and the quality parameter vector Q is updated according to the following equation:

$$[Q]_{k+1} = [Q]_k + \Delta Q \quad [5]$$

where $[Q]_k$ is the quality parameter vector at iteration step k.

Figure 3:
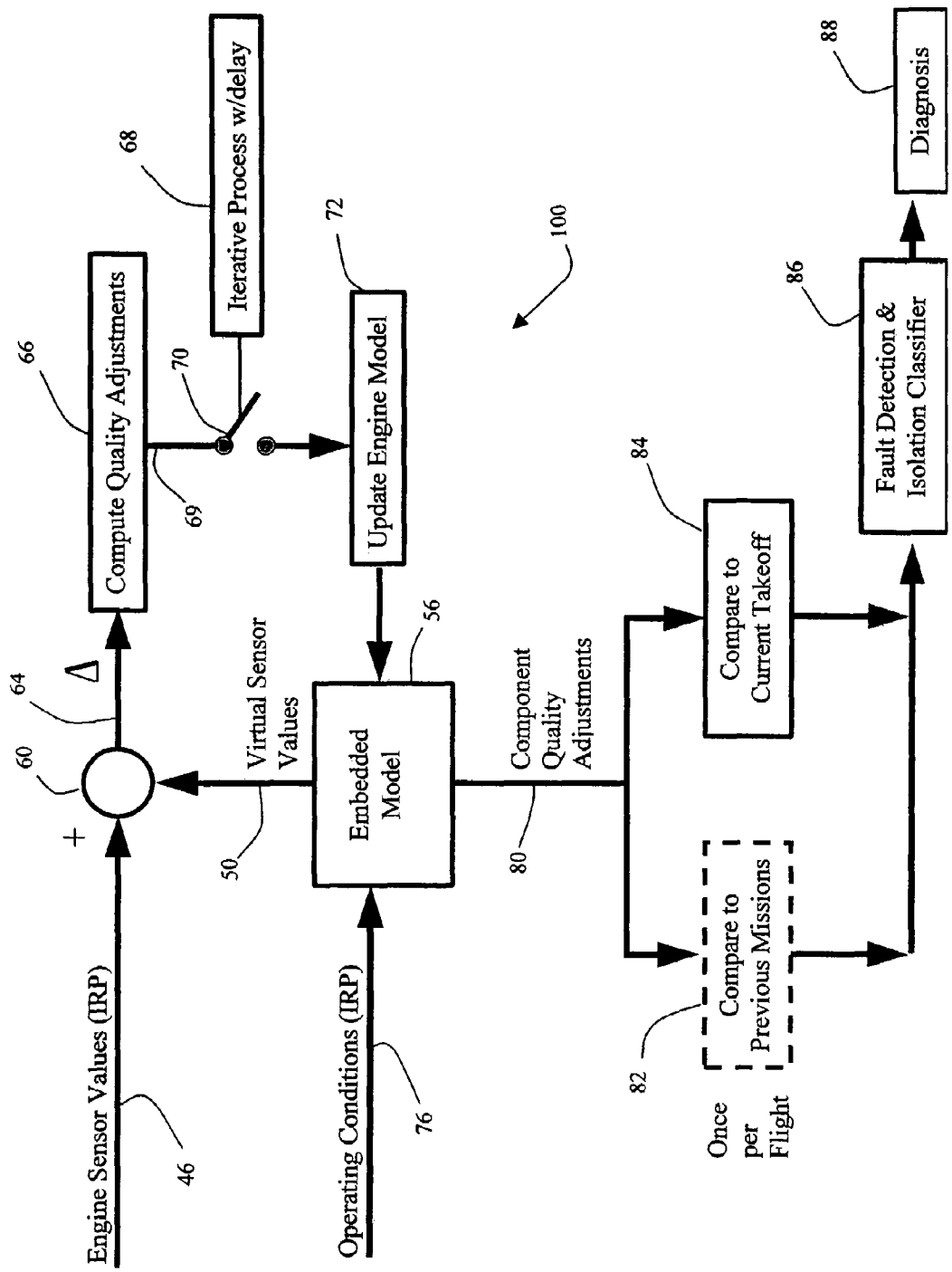
FIG. 3 is a diagram of a quality optimization process using the quality estimation method of the present invention.

In another aspect of the invention, the iterative process described above is modified to provide a fault detection and isolation process in FIG. 3. The embedded engine model 56 outputs a set of component quality adjustments 80. The component quality adjustments 80 are compared to previous missions once per flight, as indicated at step 82. Thereafter, the component quality adjustments 80 are compared to the current take off parameters at step 84. The output of both steps 82 & 84 is connected to a fault detection and isolation classifier 86. The output from the fault detection and isolation classifier 86 is then transmitted for diagnosis 88.

Figure 4:
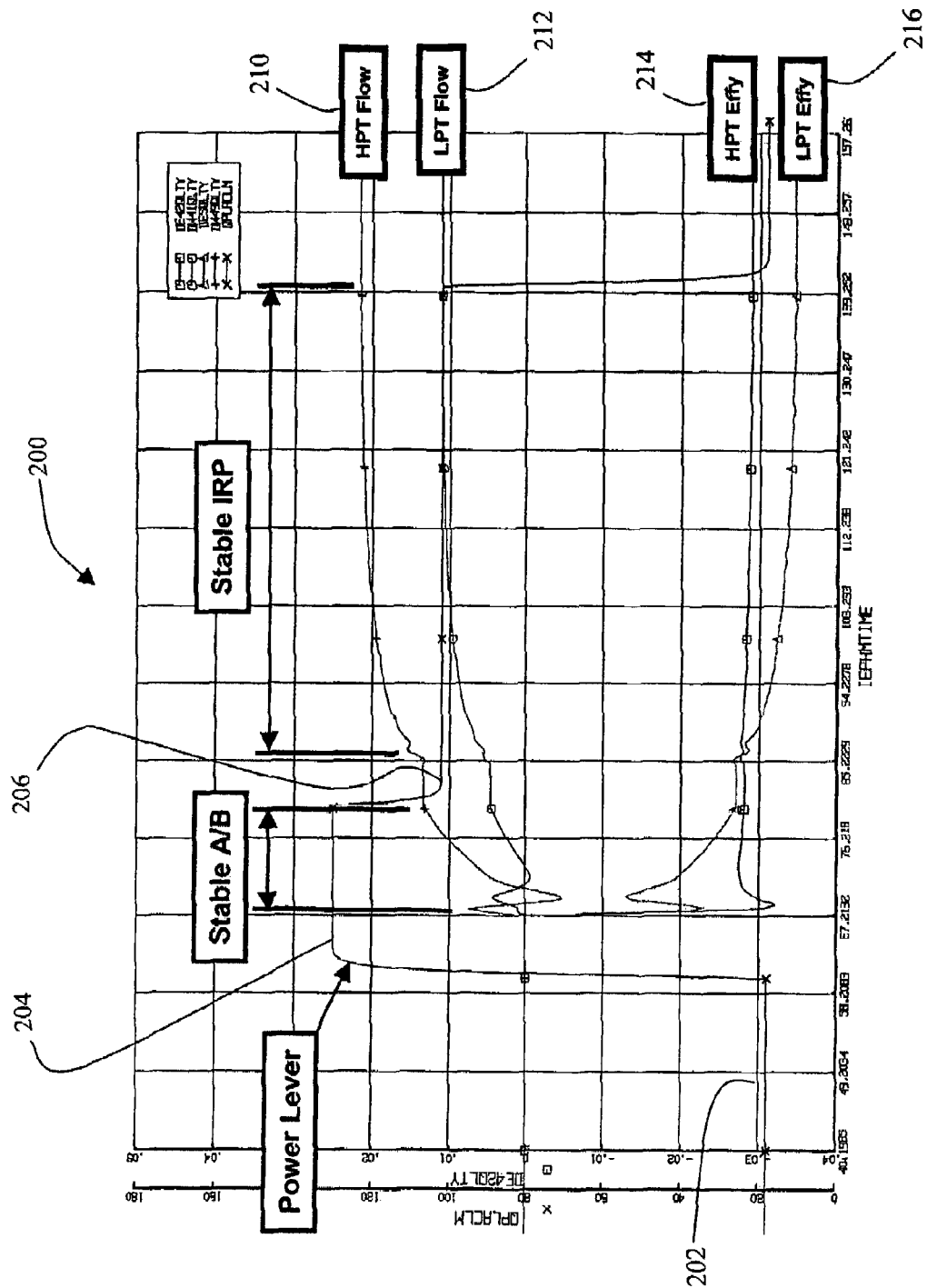
FIG. 4 is a graphical representation of the changes in quality deltas during an exemplary take off.

Referring next to FIG. 4, a graphical representation shows the changes in quality deltas during an exemplary take off, for HPT and LPT flow and efficiency parameters. The graph 200 is a comparison of F414 engine data from an ASMET test engine in which the engine cycle was driven from a low power level 202, then a power burst to maximum after-burner (A/B) 204 followed by a power reduction to stable Intermediate Rated Power (IRP) 206. A tracking filter was employed to match the component level model (CLM) to the ASMET engine test data. The results plotted by the graph indicate the percentage change in the quality deltas or differences during the match up engine run.

HPT flow quality delta 210 in the stable IRP range increased between about 1.25 percent and 2.25 percent. LPT flow quality delta 212 was approximately even in the stable IRP range at about plus 1.1 percent. HPT efficiency 214 in the stable IRP range was steady at about minus 2.9 percent, and LPT efficiency 216 in the stable IRP range varied between about minus 2.7 percent and minus 3.5 percent.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of estimating performance for a plurality of engine components of a gas turbine engine, the engine components having a plurality of sensors responsive to the engine component operation, the method comprising:

generating virtual sensor values and quality parameters with an engine model, the virtual sensor values corresponding to values from a plurality of sensors of the plurality of engine components;

comparing the virtual sensor values to actual sensor values provided by the plurality of sensors to calculate a difference between the actual and virtual sensor values;

amplifying the difference by a predetermined gain;

generating a plurality of quality parameter deltas in response to the difference;

iteratively updating the engine model by inputting a predetermined portion of the generated plurality of quality parameter deltas into the engine model;

adjusting the embedded engine model for engine operating conditions;

determining any one of forecasting engine component useful life, the scope of a maintenance overhaul, and detecting and isolating component damage or faults; and repeating the steps of generating virtual sensor values, comparing the virtual sensor values, amplifying the difference, generating a plurality of quality parameter deltas and updating the embedded model.

2. The method of claim 1, also including generating a set of quality adjustment parameters for the plurality of engine components.

3. The method of claim 1, wherein the engine model is one of a physics-based model, regression model or neural net model.

4. The method of claim 1, wherein the engine model includes models of a fan, at least one compressor, a high-pressure turbine and a low pressure-turbine.

5. The method of claim 4, wherein the engine model also includes models of an air inlet, a burner, a core nozzle, a bypass duct, a bypass nozzle and an exhaust.

6. The method of claim 5, wherein each model of a component of the engine model is individually modeled and assembled into a component level model.

7. The method of claim 1, wherein the quality parameter deltas include flow modifier and efficiency modifier.

8. The method of claim 1, wherein the predetermined gain is computed based on a number of virtual sensor values and quality parameters, and the virtual sensor values are a function of the quality parameters.

9. The method of claim 8, wherein generating of the quality parameters deltas includes computing the quality parameter deltas as a function of a design constant multiplied by an error vector and an algorithm, wherein the algorithm is a Jacobian function defined as:

$$J_Y = \begin{pmatrix} \frac{\partial y_1}{\partial q_1} & \cdots & \frac{\partial y_1}{\partial q_m} \\ \vdots & \ddots & \vdots \\ \frac{\partial y_n}{\partial q_1} & \cdots & \frac{\partial y_n}{\partial q_m} \end{pmatrix}$$

wherein n represents the number of virtual sensor values; m represent the number of quality parameters; $y_i$ corresponds to the $i^{th}$ computed sensor value; and $q_i$ represents the $i^{th}$ component quality parameter.

10. The method of claim 9, wherein the Jacobian function is a derivative of a function Y(Q), wherein the function Y(Q) is defined as:

$$Y(Q) = \begin{pmatrix} y_1(q_1, \ldots, q_m) \\ y_2(q_1, \ldots, q_m) \\ \vdots \\ y_n(q_1, \ldots, q_m) \end{pmatrix}.$$

11. The method of claim 10, wherein generating a plurality of quality parameter deltas includes computing the quality parameter deltas as the product of the predetermined gain having a gain value h, the difference having an error vector E, and the matrix $J_y$, the error vector E being defined as:

$E=(e_1 \ldots e_n)=(s_1-y_1 \ldots s_n-y_n)$, $s_i$ representing the $i^{th}$ actual engine sensor value.

12. The method of claim 11, wherein at each iteration of the algorithm, the quality parameter deltas $\Delta Q$ are computed based on the current values of E, and the quality parameters updated according to the following equation:

$[Q]_{k+1}=[Q]_k+\Delta Q$ where $[Q]_k$ is the quality parameter vector at an iteration step k.

13. A system for estimating performance for a plurality of engine components of a gas turbine engine comprising:
an engine model configured to compute virtual sensor values and quality parameters, the virtual sensor values corresponding to sensor values from a plurality of sensors of the plurality of engine components;
a comparator to compare the virtual sensor values to actual sensor values from the plurality of sensors to calculate the difference between the actual and virtual sensor values;
an amplifier having a predetermined gain;
a processor unit to calculate a plurality of quality parameter deltas in response to the calculated difference between actual and virtual sensor values;
automatic switching means for iteratively updating the engine model by switching a predetermined portion of the calculated quality parameter deltas into the engine model; and
determining any one of forecasting engine component useful life, the scope of a maintenance overhaul, and detecting and isolating component damage or faults;
wherein the engine model has at least one input to receive engine operating conditions, the engine operating conditions being used to generate the virtual sensor values provided to the comparator.

14. The system of claim 13, wherein the engine model includes an output configured to provide a set of quality adjustment parameters for the plurality of engine components.

15. The system of claim 13, wherein the engine model is a physics-based, model, regression model or neural net model.

16. The system of claim 13, wherein the engine model includes models of a fan, at least one compressor, a high-pressure turbine and a low pressure-turbine.

17. The system of claim 16, wherein the engine model also includes models of an air inlet, a burner, a core nozzle, a bypass duct, a bypass nozzle and an exhaust.

18. The system of claim 17, wherein each model of a component of the engine model is individually modeled and assembled into a component level model.

19. The system of claim 13, wherein the quality parameter deltas include flow modifier and efficiency modifier.

20. The system of claim 13, wherein the predetermined gain is computed based on a number of virtual sensor values and quality parameters, and the virtual sensor values are a function of the quality parameters.

21. The system of claim 20, wherein generating of the quality parameters deltas includes computing the quality parameter deltas as a function of a design constant multiplied by an error vector and an algorithm, wherein the algorithm is a Jacobian function defined as:

$$J_Y = \begin{pmatrix} \dfrac{\partial y_1}{\partial q_1} & \cdots & \dfrac{\partial y_1}{\partial q_m} \\ \vdots & \ddots & \vdots \\ \dfrac{\partial y_n}{\partial q_1} & \cdots & \dfrac{\partial y_n}{\partial q_m} \end{pmatrix}$$

wherein n represents the number of virtual sensor values; m represent the number of quality parameters; $y_i$ corresponds to the $i^{th}$ computed sensor value; and $q_i$ represents the $i^{th}$ component quality parameter.

22. The system of claim 21, wherein generating a plurality of quality parameter deltas includes computing the quality parameter deltas as the product of the predetermined gain having a gain value h, the difference having an error vector E, and the matrix $J_y$, the error vector E being defined as:

$E=(e_1 \ldots e_n)=(s_1-y_1 \ldots s_n-y_n)$, $s_i$ representing the $i^{th}$ actual engine sensor value; and wherein at each iteration of the algorithm, the quality parameter deltas $\Delta Q$ are computed based on the current values of E, and the quality parameters updated according to the following equation:

$[Q]_{k+1}=[Q]_k+\Delta Q$ where $[Q]_k$ is the quality parameter vector at an iteration step k.

* * * * *